United States Patent Office 3,277,159
Patented Oct. 4, 1966

3,277,159
PROCESS FOR THE PRODUCTION OF UNSATURATED ESTERS AND ACETALS FROM OLEFINS
William D. Schaeffer, Pomona, Calif., assignor to Union Oil Company of America, Los Angeles, Calif., a corporation of California
No Drawing. Filed June 18, 1963, Ser. No. 288,620
12 Claims. (Cl. 260—497)

This invention relates to the oxidation of olefins to carbonyl compounds by the use of organic solutions containing catalytic amounts of a platinum metal and, in particular, relates to a method for preventing the formation of tenacious precipitates of the noble metal upon the vessel walls and equipment used in the process.

In a particular embodiment, this invention relates to the oxidation of ethylene to vinyl acetate and acetaldehyde in the presence of an acetic acid solution containing a platinum metal, particularly solutions containing palladium.

In a second embodiment, the invention relates to the oxidation of ethylene to acetals and acetaldehyde by contacting the ethylene with an alcoholic solution containing catalytic amounts of a platinum metal, particularly palladium, in the presence of oxygen.

Other embodiments of the invention will be apparent from the following description.

In the aforementioned oxidation of olefinic compounds by contacting the olefin with oxygen and an organic solution containing catalytic amounts of a platinum metal, the reaction proceeds by the simultaneous reduction of the dissolved metal ions to free metal precipitates and the reoxidation of the metal to dissolved ions. Additionally, various redox salts are employed, such as copper and iron halides, and these redox metals also fluctuate between their high and low oxidation state during the reaction. Consequently, the solution withdrawn as a crude product from the reactor contains a substantial proportion of its noble metal as suspended particles of the free metal together with some insoluble salts of the low oxidation state of the redox metal.

Although the difficulties in handling this crude product containing suspended solids can be circumvented somewhat by filtering the liquid to remove the suspended solids, subsequent precipitation of the platinum metal ions as the free metal generally occurs when the crude product is distilled for recovery of the oxidation products.

The precipitation of the platinum metals from the solution is particularly irksome as the precipitate forms a tenacious deposit or film on the surfaces of customary materials of construction including glass and ceramics. Titanium linings are generally employed in the reactor to obtain the necessary corrosion resistance, and this use of titanium has reduced the problem of precipitates somewhat as the platinum metals preciptate as a crust on titanium surfaces that can be removed with sufficient agitation, e.g., stirring. The crust deposits, however, can cause difficulties by clogging transfer lines, heat exchange surfaces, etc. The problem can not be eliminated by filtering the crude oxidation product since considerable amounts of the platinum metal are dissolved in the product and, upon subsequent distillation, the dissolved noble metal precipitates as the free metal.

It is an object of this invention to provide an efficient method for the oxidation of olefins to valuable oxidized products.

It is also an object of this invention to prevent the precipitation of adherent deposits of Group VIII noble metal catalysts, particularly palladium, on the surfaces of equipment employed in said oxidation.

It is a further object of this invention to provide an efficient distillation method for the recovery of the oxidized products from the crude oxidate.

Other and related objects of this invention will be apparent from the following description of the invention.

I have now found that the formation of a tenacious deposit of platinum metals, particularly palladium, can be prevented by incorporating an inert, finely-divided solid in the liquid. The presence of a finely-divided solid in the liquid substantially eliminates the formation of a palladium deposit on the surface of the distillation vessel reactor or other equipment used in handling the liquid. Additionally, the presence of the finely-divided solid in the reactor reduces the agglomeration of palladium as a black crust that is otherwise obtained in titanium lined vessels. This is beneficial as such crusts tend to plug lines, pumps and equipment employed in handling the solution.

I have further found that the finely-divided solid which is impregnated with palladium precipitates during the reaction or distillation of the crude oxidate can be recycled to the reaction zone and the palladium readily dissolves and again catalyzes the oxidation. The solid, consequently, can be recycled indefinitely with the catalyst solution to prevent the formation of tenacious palladium deposits on the vessel walls and equipment surfaces.

In general, between about 0.5 and about 20 weight percent of the reaction solvent can comprise the finely-divided solid. Preferably between about 1 and about 5 weight percent is employed. The solid can be added to the solution at any point in the process, e.g., to the reactor, the distillation flash zone or to the lines therebetween. Generally, solids have a size passing a 3 mesh and retained on a 400 mesh (U.S. standard) screen can be used, while solids sized between about 8 and about 200 mesh are preferred. In general, the smaller sized solids are more effective than the large particles and are preferred for this reason.

The solids so added should be inert to the reaction conditions, e.g., should not be dissolved in hot organic solvents containing up to about 5 weight percent dissolved bromide or chloride salts under the oxidation conditions in the reactor. Examples of suitable solids are silicas such as silica gel, diatomaceous earth, quartz, etc.; silicon carbides, e.g., Carborundum; titania; charcoal; etc. Of these, silica and particularly silica gel is preferred. When charcoal or activated carbons are used, it may be necessary to continuously or periodically add the carbon to the solution to replenish that burnt to carbon oxides in the olefin oxidation reactor. Preferably the finely-divided solid has a high specific surface to provide a large area for deposition of the platinum metal. Solids having a specific surface from about 2 to about 1000 square meters per gram are preferred and most preferred are those having from about 300 to about 850 square meters per gram.

As previously mentioned, the catalyst solution contains catalytic amounts of a platinum metal and a halogen, i.e., a bromine or chlorine containing compound. The platinum metal can be of the palladium sub-group or the platinum sub-group, i.e., palladium, rhodium, ruthenium, or platinum, osmium, rhenium and iridium. While all these metals are active for my reaction, I prefer palladium because of its much greater activity. In general the platinum metal can be employed in amounts between about 0.001 and 5.0 weight percent of the liquid reaction medium. In general, however, the reaction rate decreases at concentrations of platinum metal less than about 0.04 weight percent and amounts of the metal in excess of about 2.0 weight percent do not appreciably increase the rate of oxidation. Accordingly, the preferred limit of the metal is between about 0.04 and about 2.0 weight percent of the catalyst solution. The platinum metal can be added to the reaction medium as finely-divided metal, as a soluble salt or as a chelate. Examples of suitable salts are the halides and acetates such as palladium chloride, rhodium acetate, ruthenium bromide, osmium oxide, iridium chloride and palladium chloride. Examples of suitable chelates are palladium acetylacetenate and complexes of noble metal ions with such conventional chelating agents as tetraacetic acid, citric acid, etc.

The other necessary component of my catalyst solution is a halogen, i.e., bromine or chlorine containing compound. The halogen can be added as elemental chlorine or bromine; however, it is preferred to employ less volatile halogen compounds such as hydrogen chloride; hydrogen bromide; alkali metal halides, e.g., sodium chloride, lithium bromide, cesium chloride, potassium bromide, sodium bromate, lithium chlorate; ammonium halides, ammonium bromide, ammonium chloride; or any of the aforementioned platinum metal bromides or chlorides. Various organic compounds which liberate hydrogen halide or halogen under the reaction conditions can be used, such as aliphatic chlorides or bromides, e.g., ethyl bromide, propyl chloride, butyl chloride, benzyl bromide, phosgene, etc. In general, sufficient of the aforementioned halogen containing compounds should be added to provide between about 0.05 and about 5.0 weight percent free or coordinately bonded or covalently bonded halogen in the reaction zone; preferably concentrations between about 0.1 and about 3.0 are employed. While chlorine containing compounds are generally preferred, bromine compounds can be preferred for certain reactions, e.g., in substantially anhydrous acetic acid, bromine compounds tend to favor oxidation of ethylene to vinyl acetate whereas chlorine compounds tend to favor the oxidation of ethylene to acetaldehyde and, ultimately, to acetic acid.

As previously mentioned, the reaction medium preferably comprises a substantially anhydrous organic solvent. In general, the water content of the reaction medium should be less than about 20 weight percent, preferably less than about 10 percent and, most preferably, less than about 3 weight percent. During the oxidation of the olefin, water is formed and accumulates in the reaction medium. Accordingly, it is preferred to recycle the reaction medium as a substantially anhydrous liquid and to employ relatively high liquid space rates to prevent the accumulation of amounts of water in excess of those previously stated. In general, the presence of the water in the reaction medium favors the oxidation of the olefin to aldehydes or ketones whereas the oxidation in anhydrous or substantially anhydrous organic media favors more valuable oxidized products such as unsaturated esters and acetals.

In general, for the oxidation of olefins to acetals, the organic solvent employed is an aliphatic alcohol that is a liquid under the reaction conditions. Aliphatic alcohols having from 1 to about 20 carbon atoms can be employed such as methanol, ethanol, isopropanol, propanol, butanol, isobutanol, pentanol, isopentanol, hexanol, isohexanol, heptanol, isoheptanol, cyclohexanol, octanol, isooctanol, decanol, isodecanol, tridecanol, isododecanol, pentadecanol, isohexadecanol, octadecanol, tricosanol, isotetracosanol, pentacosanol, etc. Preferably, primary or secondary low molecular weight alcohols having from 1 to about 5 carbons are employed as solvents including methanol, ethanol, propanol, isopropanol, butanol, isobutanol, pentanol, isopentanol, etc.

For the preparation of unsaturated esters of carboxylic acids, the reaction medium should comprise a carboxylic acid such as acetic, propionic, butyric, valeric, isovaleric, caprylic, isocaprylic, succinic, glutaric, adipic, pimelic, etc. Preferably, the carboxylic acid employed is the acid of the desired acetoxy radical desired in the unsaturated ester, e.g., acetic acid is used in the preparation of vinyl acetate, propionic acid is employed in the preparation of vinyl propionates, etc.

Various other inert organic solvents can be employed in addition to the reactive alcohol or carboxylic acid aforementioned. Examples of various organic liquids that can also be present in amounts between about 0 and about 90 percent of the reaction medium employed for the synthesis of acetals or unsaturated esters include formamide, dimethyl formamide, chlorobenzene, dichlorobenzene, aliphatic hydrocarbons such as hexane, decane, dodecane, etc.; toluene, xylene, pseudocumene, etc.

In the oxidation of olefins to unsaturated esters, the yields of ester product can be greatly increased by the addition of various carboxylate salts to the reaction medium. Generally, any soluble carboxylate salt can be added such as alkali metal carboxylates, alkaline earth carboxylates, any of the aforementioned Group VIII noble metal carboxylates or a carboxylate salt of the optional redox metals hereinafter described. The alkali metal carboxylates are preferred for their greater solubility in the organic reaction medium and of these, lithium carboxylates are most preferred. Generally, between about 0.1 and about 10 weight percent of a soluble carboxylate salt is added, preferably between about 0.5 and about 5.0 weight percent is employed. The particular alkali metal chosen has some effect on the distribution of products in the unsaturated ester production, particularly the vinyl acetate synthesis. To illustrate, the use of sodium and potassium acetates generally favor acetaldehyde and vinyl acetate production and the lithium salts favor acetic acid production. Lithium salts, however, are preferred in this oxidation because of their greater solubility and hence, the greater acetate ion concentration that can be achieved with the use of lithium.

It is of course apparent that the carboxylate salts can be formed in situ by the addition of the hydroxides of most of the aforementioned metals, particularly the alkali metal hydroxides or halides.

As previously mentioned, various redox compounds can, optionally, be used in the reaction medium. In general, any multivalent metal salt having an oxidation potential higher, i.e., more positive, than the platinum metal in the solution can be used. Typical of such are the soluble salts of multivalent metal ions such as the acetates, bromides or chlorides of copper, iron, manganese, cobalt, mercury, nickel, cerium, uranium, bismuth, tantalum, chromium, molybdenum or vanadium. Of these, cupric and ferric salts are preferred and cupric salts are most preferred, particularly in the substantially anhydrous medium where the cupric salts appreciably increase the rate of oxidation. In general, cupric acetate, chloride or bromide is added to the reaction medium to provide a concentration of copper therein between about 0.1 and about 5 weight percent; preferably between about 0.5 and about 3.0 weight percent.

Various other oxidizing agents can also be employed to accelerate the rate of reaction. Included in such agents are the nitrogen oxides that function in a manner similar to the redox agents previously described. These nitrogen oxides can be employed as the only redox agent in the reaction medium or they can be employed jointly with the aforedescribed redox metal salts such as cupric or ferric salts. In general, between about 0.01 and about 3 weight percent of the reaction medium; preferably between about 0.1 and about 1 weight percent; calculated as nitrogen dioxide can comprise a nitrogen oxide that is added as a nitrate or nitrite salt or nitrogen oxide vapors. The nitrogen oxides can be added to the reaction medium in various forms, e.g., nitrogen oxide vapors such as nitric oxide, nitrogen dioxide, nitrogen tetraoxide, etc. can be introduced into the reaction medium or soluble nitrate or nitrite salts such as sodium nitrate, lithium nitrate, lithium nitrite, potassium nitrate, cesium nitrate, etc., can be added to the reaction medium. In general, the use of these nitrate redox agents are preferred in anhydrous systems and the combined use of cupric salts and nitrate co-redox agents is most preferred for the low temperature operations where the reaction rate would otherwise be prohibitively slow. The use of the nitrogen oxide as redox agents does not appreciably alter the yields of the major products, i.e., acetals, vinyl acetate, acetaldehyde and/or acetic acid, however, it is apparent to those skilled in the art that the nitrogen oxides should be used with caution in the alcoholic reaction medium used in acetal synthesis.

In general, the oxidation of olefins to unsaturated esters, e.g., ethylene to vinyl acetate, is preformed by introducing oxygen or an oxygen containing gas and the olefin into contact with the catalyst at temperatures between about 30° and about 300° C.; 90° to about 180° C. are preferred and, to obtain optimum yields of unsaturated esters, temperatures between about 120° and about 160° C. are most preferred. In general, the oxidation of ethylene to high yields of acetic acid is favored at higher temperatures and therefore, when operating so as to generate sufficient acetic acid in situ to equal that consumed in the formation of vinyl acetate, the higher temperatures are preferred in this synthesis, from about 130° to about 180° C.

The oxidation of olefins to acetals, particularly the oxidation of ethylene to 1,1-diethoxyethane is conducted at temperatures between about 30° and about 200° C.; between about 80° and about 150° C. are preferred.

The reaction pressures employed in either oxidation are sufficient to maintain liquid phase conditions and from about atmospheric to about 100 atmospheres or more, preferably elevated pressures from about 10 to about 75 atmospheres are employed and most preferably, pressures from about 40 to about 75 atmospheres are used to obtain a high reaction rate. In general, high ethylene partial pressures result in maximum rates of oxidation. Additionally, the use of high ethylene partial pressures in the synthesis of vinyl acetate results in maximum acetaldehyde and vinyl acetate synthesis.

Under the aforedescribed conditions, the olefin is rapidly oxidized to the desired compounds. In general, the liquid catalyst solution is supplied and recycled to the reaction zone at maximum rates to prevent the accumulation of substantial amounts of water that will otherwise reduce the rate of oxidation.

The following examples will illustrate the results obtainable when practicing my invention:

*Example 1*

To a one-liter glass flask equipped with a stirrer, thermometer and distillation head are added 500 grams of a crude reaction product from a previous vinyl acetate synthesis. The crude product contains slight precipitates of cuprous chloride and palladium, however most of the copper and some of the palladium are dissolved as cuprous and palladous ions. The liquid charge comprises chiefly acetic acid, about 15 weight percent of vinyl acetate, about 5 weight percent of acetaldehyde, about 3 weight percent water and slight amounts of polyvinyl acetate and other high boiling by-products of the oxidation. To the liquid is added 20 grams of finely divided silica gel; Davison Co-12 calcined at 400° C. for 16 hours to obtain a specific surface of 780 square meters per gram; and then the distillation is performed to recover the vinyl acetate and aldehyde products.

Although the distillation is performed in a glass vessel identical to vessels previously employed when the palladium was observed to form a highly adherent deposit upon the interior surfaces, in the present distillation all the palladium precipitates upon the silica gel and none precipitates upon the glass vessel.

When the distillation is repeated with about 15 grams of activated carbon as the finely divided solid, substantially the same results are obtained.

*Example 2*

A solution is prepared by the addition of 7.5 grams lithium chloride, 7.5 grams lithium acetate, 7.5 grams of cupric acetate and all of the palladium-silica gel composite formed in the previous example to 750 grams of acetic acid. The solution is charged to a 1-gallon autoclave and employed for the synthesis of vinyl acetate. The autoclave is closed and pressured to 500 p.s.i.g. with ethylene, then heated to 149° C. and adjusted to 900 p.s.i.g. with nitrogen. Thereafter oxygen is admitted to raise the pressure to 20 p.s.i. and the system immediately reacts with the oxygen in the manner previously observed for experiments where the palladium was introduced as soluble palladium chloride. Oxygen is slowly introduced over a 30-minute period to complete the oxidation. At the end of a 30-minute period, the autoclave is cooled, opened and emptied and the crude product distilled to recover the following yields of products:

| | [1] Yield |
|---|---|
| Acetaldehyde | 34.8 |
| Vinyl acetate | 58.0 |
| Butenes | 7.2 |

[1] Mole percent of liquid products.

The preceding data are comparable to those normally obtained when the palladium is added as a soluble salt, e.g., palladium chloride, indicating that the silica gel was inert, i.e., did not alter the yield of oxidized products.

The silica gel in the crude product is observed to contain a lesser quantity of palladium metal than it contained when charged to the autoclave and some suspended particles of palladium are also present. During the subsequent distillation of the crude product, the silica gel again prevents the formation of a palladium deposit on the vessel walls.

*Example 3*

To a 1-gallon autoclave is added 8 grams of cupric chloride, and 50 grams of a silica gel containing impregnated palladium from a previous use, 550 grams of absolute ethanol and 10 milliliters of concentrated hydrochloric acid. The mixture is pressured to 500 p.s.i.g. with ethylene at room temperature, heated to 300° F. and then pressured to 900 p.s.i.g. with nitrogen. Oxygen is then slowly introduced to increase the pressure 20 p.s.i.g. An extremely rapid uptake of oxygen is observed and the reaction is continued by alternately adding oxygen and nitrogen while maintaining the total pressure near 900 p.s.i.g. After about 15 minutes the reaction is terminated, the autoclave is cooled and vented. The liquid reaction product is removed and neutralized with aqueous potassium hydroxide solution. The neutralized crude oxidate is then distilled to recover the oxidation products, consisting chiefly of acetaldehyde and acetal.

During the distillation, the silica gel present in the crude oxidate effectively prevents the precipitation of palladium on the walls of the distillation flask.

The preceding examples are intended solely to illustrate the practice of my invention and the results obtainable therewith. My invention is not intended to be unduly limited by these examples but it is intended to be defined by the method steps and their equivalents set forth in the following claims:

I claim:

1. In the oxidation of hydrocarbon olefins to valuable oxygenated compounds selected from the class consisting of unsaturated esters of carboxylic acids and acetals by contacting in a common reaction zone the olefin and oxygen with a substantially anhydrous organic reaction medium comprising a reactant selected from the class consisting of aliphatic carboxylic acids and mono-hydroxy alcohols having from 1 to about 20 carbons to prepare an unsaturated ester of said carboxylic acid when said reaction medium is selected to contain said carboxylic acid and to prepare an acetal of said alcohol when said reaction medium is selected to contain said alcohol; said reaction medium also containing catalytic amounts of a platinum group metal and at temperatures between about 50° and about 200° centigrade and sufficient pressures to maintain liquid phase conditions, the improved method for preventing the formation of tenacious deposits of the platinum group metal upon the surfaces of equipment and vessels contacted by said reaction medium that comprises incorporating in said reaction medium between about 0.5 and about 20 weight percent of a finely divided solid that passes a 3 mesh but is retained on a 400 mesh screen, that has a specific surface from about 2 to about 1000 square meters per gram and that is inert to the oxidation conditions and solvent present in the reaction zone.

2. The oxidation of claim 1 wherein said finely-divided solid has a specific surface area between about 300 and about 850 square meters per gram.

3. The oxidation of claim 1 wherein said solid is silica.

4. In the method for the oxidation of ethylene to vinyl acetate by contacting in a common reaction zone ethylene and oxygen with a liquid solution comprising an acetic acid solvent containing between about 0.04 and about 5.0 weight percent palladium and between about 0.1 and about 5.0 weight percent halide selected from the class consisting of bromine and chlorine containing compounds soluble in said acetic acid solvent at a temperature between about 50° and about 200° centigrade and a pressure between about 10 and about 80 atmospheres, the improved method for preventing the formation of tenacious palladium deposits on the surfaces of equipment and vessels contacted by said medium that comprises incorporating in said reaction medium between about 0.5 and about 20 weight percent of a finely divided solid that passes a 3 mesh but is retained on a 400 mesh screen, that has a specific surface from about 2 to about 1000 square meters per gram and that is inert to the solvent under the reaction conditions.

5. The method of claim 4 wherein said solid has a specific surface between about 200 and about 850 square meters per gram.

6. The method of claim 4 wherein said solid is silica.

7. The method of claim 4 wherein said solid is titania.

8. The method of claim 4 wherein said action medium also contains between about 0.1 and about 5 weight percent of a multivalent metal salt having an oxidation potential more positive than said platinum group metal in said solution.

9. The method of claim 4 wherein a crude oxidate is continuously withdrawn from the contacting step and distilled to recover said vinyl acetate from a distillation residue containing said solid and salts and said residue is returned to said oxidation zone.

10. In the oxidation of ethylene to acetal by contacting in a common reaction zone ethylene with oxygen in the presence of a reaction medium comprising an aliphatic alcohol having from about 1 to about 20 carbons and containing between about 0.04 and about 5.0 weight percent of palladium and between about 0.1 and about 5 weight percent of a mineral acid, the improved method of avoiding the formation of tenacious deposits of palladium on the surfaces of equipment and vessels contacted by such reaction medium that comprises incorporating between about 0.5 and about 20 weight percent of a finely divided solid in said reaction medium, said solid having a size passing a 3 mesh but retained on a 400 mesh screen, having a specific surface from about 2 to about 1000 square meters per gram and being inert to said reaction medium under the conditions in said reactors.

11. The method of claim 10 wherein said solid has a specific surface between about 200 and about 850 square meters per gram.

12. The method of claim 10 wherein said solid is silica.

References Cited by the Examiner

UNITED STATES PATENTS

| 3,057,915 | 10/1962 | Riemensch'der et al. _ 260—597 |
| 3,122,586 | 2/1964 | Berndt _____ 260—597 X |
| 3,131,223 | 4/1964 | Smidt _____ 260—597 |

FOREIGN PATENTS

| 608,610 | 3/1962 | Belgium. |
| 614,970 | 9/1962 | Belgium. |
| 137,511 | 4/1960 | U.S.S.R. |

OTHER REFERENCES

Emmet, catalysis, vol. 1, pp. 245–249, 1954.

Moiseev II, Doklady Akademii Nauk S.S.S.R., vol. 133, pp. 377–380, (1960).

Smidt I, Chemistry and Industry, Jan. 13, 1962, pp. 54–61.

Smidt II, Agnew, Chim., vol. 71, pp. 176–182 (1959).

LORRAINE A. WEINBERGER, *Primary Examiner.*

LEON ZITVER, *Examiner.*

D. P. CLARKE, B. M. EISEN, V. GARNER,
*Assistant Examiners.*